(12) United States Patent
Xiao

(10) Patent No.: US 8,608,416 B2
(45) Date of Patent: Dec. 17, 2013

(54) CARGO SUPPORTING DEVICE

(75) Inventor: Zhaoyin Xiao, Taizhou (CN)

(73) Assignee: Zhejiang Topsun Logistic Control Co., Ltd., Taizhou (CN)

( * ) Notice: Subject to any disclaimer, the term of this patent is extended or adjusted under 35 U.S.C. 154(b) by 0 days.

(21) Appl. No.: 13/295,048

(22) Filed: Nov. 12, 2011

(65) Prior Publication Data

US 2013/0017031 A1    Jan. 17, 2013

(30) Foreign Application Priority Data

Apr. 29, 2011  (CN) .............................. 201110111373
Jul. 27, 2011   (WO) ................ PCT/CN2011/077692

(51) Int. Cl.
   *B60P 7/15*   (2006.01)
   *B60P 7/08*   (2006.01)

(52) U.S. Cl.
   USPC ............................ 410/151; 410/152; 410/143

(58) Field of Classification Search
   USPC ......... 410/151, 152, 143, 144, 89, 46, 90, 91, 410/129; 248/205.3, 214, 22.51, 222.13, 248/222.12
   See application file for complete search history.

(56) References Cited

U.S. PATENT DOCUMENTS

| | | | | |
|---|---|---|---|---|
| 3,049,328 A | * | 8/1962 | Bishop | 52/632 |
| 4,781,499 A | * | 11/1988 | Wisecarver | 410/151 |
| 6,874,982 B2 | * | 4/2005 | Rhodes | 410/152 |
| 7,334,973 B2 | * | 2/2008 | Scott | 410/151 |
| 7,374,380 B2 | * | 5/2008 | Huang | 410/151 |
| 2003/0082024 A1 | * | 5/2003 | Scott | 410/151 |

FOREIGN PATENT DOCUMENTS

CN         101531160 A       9/2009

* cited by examiner

*Primary Examiner* — Glenn Dayoan
*Assistant Examiner* — Sunsurraye Westbrook
(74) *Attorney, Agent, or Firm* — Minder Law Group; Willy H. Wong

(57) ABSTRACT

The present invention discloses a cargo supporting device, addressing a problem in prior art conventional cargo supporting devices, where the teeth on the handle might be brought in dead lock with the teeth on the inner tube. The present cargo supporting device includes an inner tube and an outer tube, and the outer tube is hinged to a handle. The outer tube is further hinged with a jogged part which keeps being inserted among the teeth. A clutch mechanism is provided between the handle and the jogged part. The handle can be connected with the jogged part by means of the clutch mechanism. The handle can be disengaged from the jogged part by said clutch mechanism when the handle is turned to the inner tube. Therefore the gear would not be brought in dead lock with the teeth of the inner tube during the aforesaid two states being switched.

16 Claims, 6 Drawing Sheets

US 8,608,416 B2

CARGO SUPPORTING DEVICE

BACKGROUND OF THE INVENTION

1. Field of Invention

The present invention relates to a cargo supporting device in the field of mechanics.

2. Related Art

The cargoes have to be fixed to prevent from being slipped or displaced during transportation. In regards to ordinary convertibles, cargos could be bound directly by using ropes. However, the cargoes in containers or van trucks could not be positioned by ordinary ropes for purpose of transportation. In order to address such a problem, people have designed various kinds of tools including the cargo supporting device.

The cargo supporting device is comprised of an inner tube and an outer tube, in which the outer tube is partly covered on the inner tube. A handle is hinged to the outer tube. A pawl is provided on the inner end of the handle. The inner tube is provided with several teeth along the axial direction thereof. When the pawl of the handle is inserted among the teeth, the handle could be fixed in such a manner that the inner tube and the outer tube could be fixed and not be contracted any more.

A Chinese Patent Publication CN101531160A discloses a lock mechanism for a cargo supporting device including an inner tube and an outer tube, in which the inner end of the handle could be inserted among the teeth. When the handle is turned in one direction, the inner end of the handle would be disengaged from the teeth. When the handle is turned in the other direction, the inner end of the handle would be engaged with the teeth. Therefore, the outer tube could be fixed to the inner tube when the cargo supporting device is in operation. However, as the inner end of the handle has teeth in part, the teeth on the handle are engaged with the teeth on the inner tube in the connection state, and are separated from the teeth on the inner tube in the separation state. However, the teeth on the handle could be deadly locked with the teeth on the inner tube while the handle is turned, which brings about poor reliability of the cargo supporting device in use.

SUMMARY OF THE INVENTION

An object of the present invention is to provide a cargo supporting device having higher reliability in use, so as to address the problems existing in the prior art.

In order to achieve the object of the invention, the invention provides a cargo supporting device comprising an inner tube and an outer tube partly covered on the inner tube, in which the inner tube is provided with teeth along the axial direction, and the outer tube is hinged to a handle. The outer tube is further hinged with a jogged part which keeps being inserted among the teeth. A clutch mechanism is provided between the handle and the jogged part. The handle could be connected with the jogged part by means of the clutch mechanism. The handle could be disengaged from the jogged part by said clutch mechanism when the handle is turned to the inner tube.

In the cargo supporting device of the invention, the handle is separate from the jogged part by means of the clutch mechanism when the handle is turned to the inner tube, in which case the inner tube could be extended or contracted with respect to the outer tube. On the other hand, the handle is connected with the jogged part by means of the clutch mechanism when the handle is turned to the outer tube. In addition, the jogged part is engaged with the teeth on the inner tube in such a manner that the jogged part would not move as long as the handle is not turned. In other words, the inner tube could not be extended or contracted with respect to the outer tube as the outer tube and inner tube are kept in this state. The cargos could be stably supported by the outer tube and inner tube with an adjusted length, so that the cargos would not be displaced or dropped off during transportation.

In the cargo supporting device of the invention, the jogged part is a gear. The gear could keep being engaged with the teeth on the inner tube. Meanwhile, the handle could be connected with any two teeth of the gear.

In the cargo supporting device of the invention, the clutch mechanism includes a baffle movable the axial direction of the handle and a cam located on the outer tube. A spring is provided between the baffle and the handle. The baffle could be pressed against the cam with the elastic force of the spring and tends to be inserted into the gear.

The baffle keeps being pressed against the edge of the cam. As the edge of the cam has a lower portion and an upper portion, the baffle could be inserted into the gear when the baffle moves to the lower portion of the edge of the cam.

In the cargo supporting device of the invention, the gear is hinged to the center of the cam. The distance from the edge of the cam adjacent to the outer tube to the hinging part is smaller than that from the edge of the cam adjacent to the inner tube to the hinging part. The arc-shaped edge of the cam transits smoothly. A part of the gear is protruded from the cam.

Obviously, in such a configuration, the baffle is separate from the gear when the baffle is located at the upper portion of the cam, and the baffle is connected with the gear when the baffle is located at the lower portion of the cam.

In the cargo supporting device of the invention, both sides of the handle have bar-shape holes axially parallel with the handle. Both sides of the baffle could be inserted into said two bar-shape holes respectively.

The bar-shape holes could guide the movement of the baffle. As the bar-shape holes are disposed along the axial direction of the handle, the baffle moves along the axial direction of the handle as well.

In the cargo supporting device of the invention, the baffle has a bar-shape connecting piece and the spring is seated on the connecting piece.

The spring could be located by the connecting piece to prevent the spring falling off. As such, the baffle could be stably pressed against the edge of the cam with the elastic force of the spring.

In the cargo supporting device of the invention, the spring is a coil spring, both ends of which could be acted against the handle and baffle respectively. The coil spring is positioned at the side of the handle.

The baffle tends to be pressed against the cam by the torsion coil spring. Meanwhile, the coil spring positioned at the side of the handle would not occupy any space.

In the cargo supporting device of the invention, the outer tube is fixedly connected with a sleeve which coincides with the shape of the outer tube, and the cam is integrated with the sleeve.

As the sleeve could be conveniently processed, such a configuration could simplify the processing of the whole cargo supporting device.

In the cargo supporting device, the handle is hinged to the sleeve.

In the cargo supporting device, the sleeve has a connecting section and an operating section. The shape of the connecting section coincides with that of the outer tube. The inner cavity of the operating section has a dimension smaller than that of the outer tube. Said cam is located at the operating section.

When the sleeve is covered at the end of the outer tube, the port of the operating section is located against the port of the outer tube, which makes the connecting position of the sleeve and the outer tube fixed. In other words, when the operating section rests against the port of the outer tube, each sleeve is located on the outer tube at the same fixed position.

In the cargo supporting device of the invention, a positioning mechanism is set between the handle and the connecting section of the sleeve, and the handle could be located by the positioning mechanism when the handle is turned to the outer tube.

The handle is connected with the gear when the handle is turned to the outer tube, so that the outer tube and inner tube are fixed. Thereafter, it is ensured that the handle would not be removed to loosen the inner tube and outer tube by using this positioning mechanism.

In the cargo supporting device of the invention, the positioning mechanism includes a positioning member and a positioning hole on the handle. The inner end of the positioning member could be hinged to the sleeve. The outer end of the positioning member has a catch protruded to the side and the catch could be joined with the edge of the positioning hole.

The positioning member is joined with the edge of the positioning hole after swinging about the hinging part. Therefore, the positioning member could hitch the handle, and stably locate the handle on the condition that the positioning member is not removed, so as to prevent the handle being loosened or removed.

In the cargo supporting device of the invention, a lap spring is provided between the positioning member and the outer tube. The outer end of the positioning member tends to rest against the edge of the positioning hole under the elastic force of the lap spring.

The positioning member keeps being located against the edge of the positioning hole with the elastic force of the lap spring. The handle could not be removed or loosened unless the elastic force of the spring could be overcome.

In the cargo supporting device of the invention, the inner end of the positioning member is hinged to the sleeve.

It is obvious that the handle, gear and positioning member are located on the sleeve. During assembly, the outer tube is connected to the sleeve in the first place, and then the handle, gear and positioning member are connected with the sleeve. Alternatively, the handle, gear and positioning member are connected to the sleeve firstly, and then the thus connected sleeve is connected with the outer tube.

In the cargo supporting device of the invention, the ends of the outer tube and inner tube other than those connected with each other are respectively provided with foot rests made by rubber materials.

The contact area could be increased and the buffering effect could be achieved by the foot rests.

In the cargo supporting device of the invention, the inner tube has a U-shape flexible clip therein. The flexible clip has protruded raised heads at both ends. Said both raised heads partly extend out of the inner tube with the elastic force of the flexible clip. The outer tube has bar-shape buffer holes at the side thereof which are arranged along the axial direction of the outer tube. The raised heads could rest against the edge of the buffer holes.

While the inner tube is contracted with respect to the outer tube, the several bar-shape holes at the side of the outer tube could take the function of gradually contracting the inner tube. That is to say, while the inner tube moves with respect to the outer tube, there would be an intermission when the flexible clip is inserted into one of the buffer holes, and be another intermission when the flexible clip is inserted into the next neighboring buffer hole. In this case, the inner tube would not slip too fast.

Compared with the prior art, in the cargo supporting device of the invention, as the gear and cam are disposed between the inner tube and the handle, the baffle of the handle could be ensured to be completely connected with the gear or completely separate from the gear while the handle is turned. Furthermore, the gear would not be brought in dead lock with the teeth of the inner tube during the aforesaid two states being switched. Therefore, the cargo supporting device has relatively high reliability in use.

Moreover, the baffle could stably move along the edge of the cam while the cargo supporting device of the invention is in operation. The handle could be smoothly turned, conveniently operated and present a good hand feel.

In addition, the cargo supporting device of the invention could prevent contraction of the inner tube to a large extent by using the flexible clip, thereby further improving its reliability in use.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
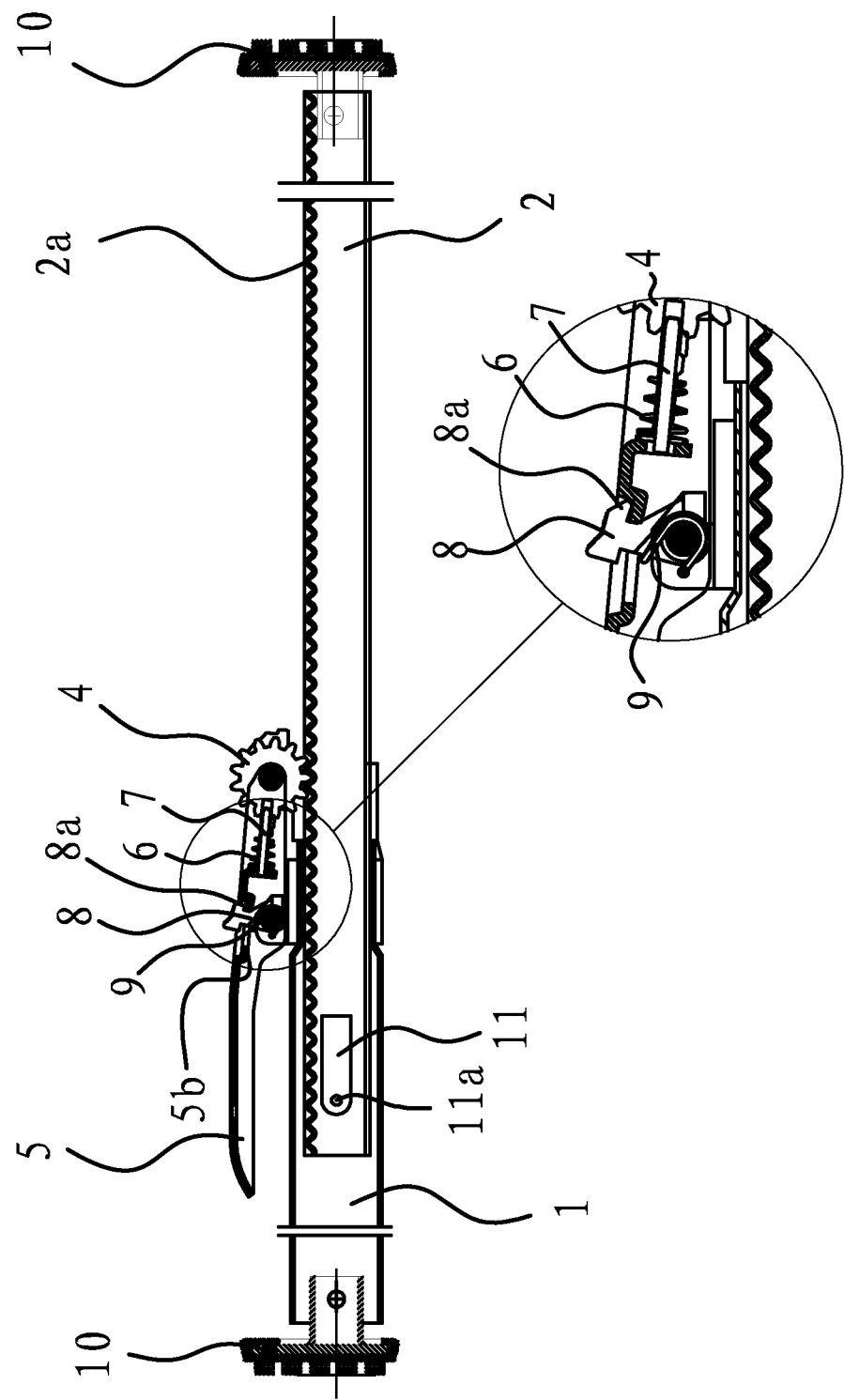
FIG. 1 is a sectional structural diagram of the cargo supporting device of the invention in the locked state.
Figure 2:
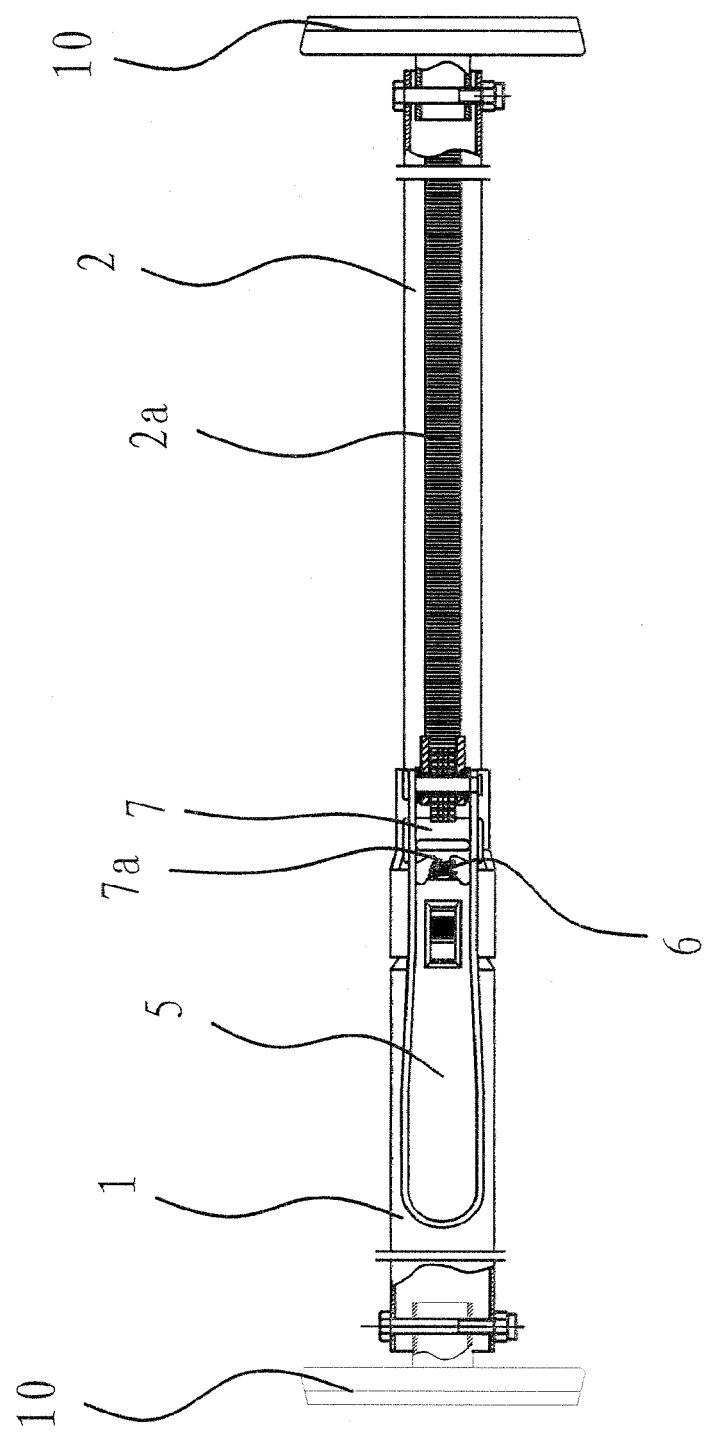
FIG. 2 is a top structural diagram of the cargo supporting device of the invention in the locked state.
Figure 3:
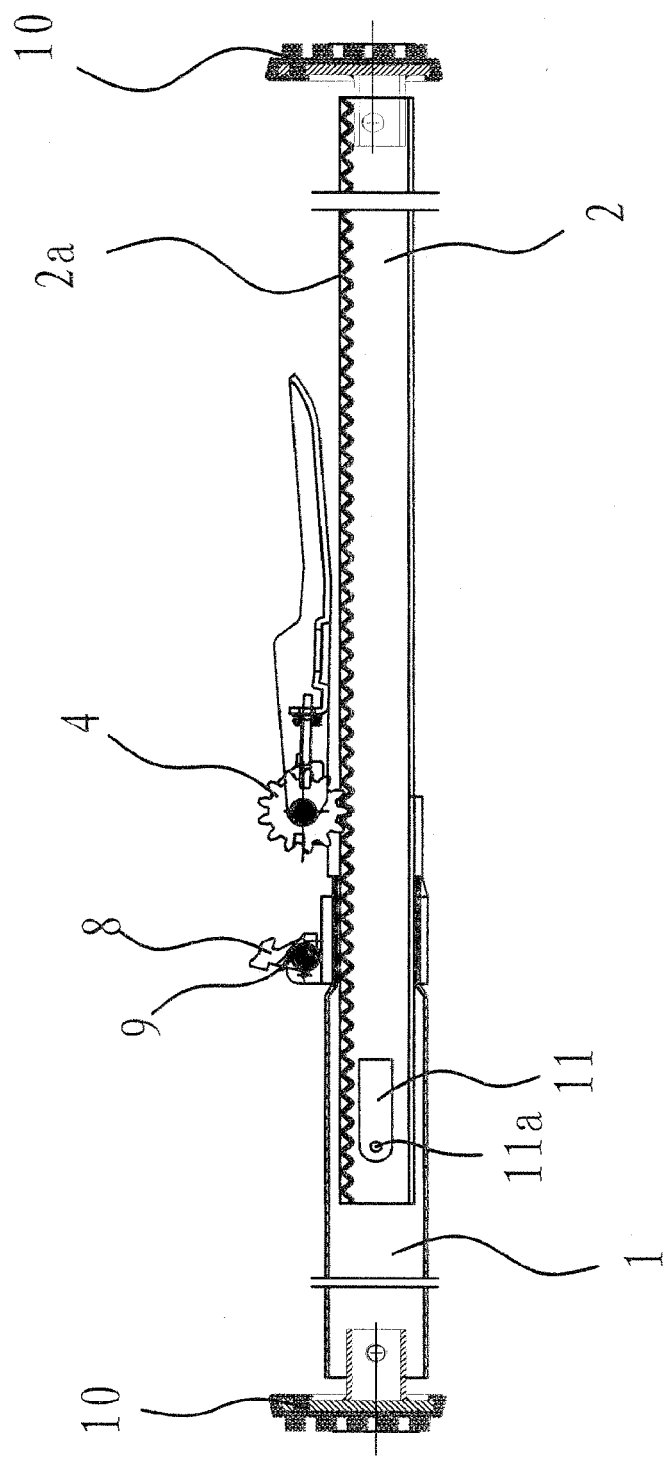
FIG. 3 is a sectional structural diagram of the cargo supporting device of the invention in which the inner tube could be contacted.

As shown in FIGS. 1, 2 and 3, the cargo supporting device of the invention could be used for supporting the cargoes, so that the cargoes would not be loosed or dropped to pieces during transportation. The cargo supporting device includes an inner tube 2 and an outer tube partly covered on the inner tube 2. The inner tube 2 is provided with teeth 2a along the axial direction thereof.

Figure 4:
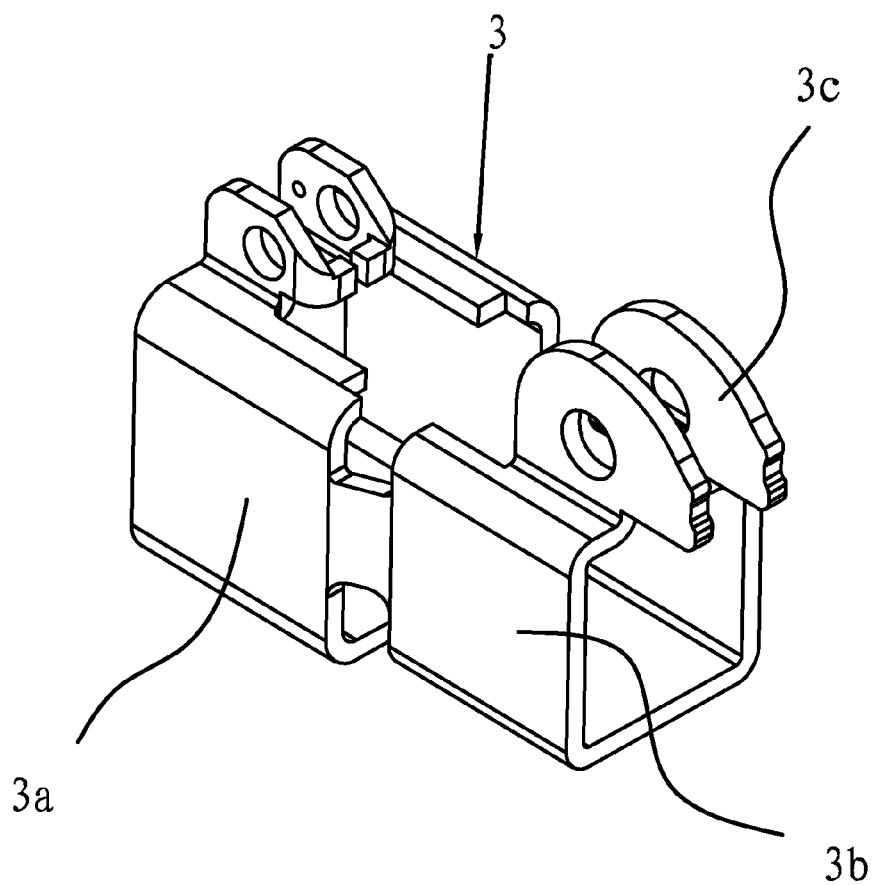
FIG. 4 is a stereogram of the sleeve of the cargo supporting device of the invention.

As shown in FIG. 4, a sleeve 3 is covered on the outer tube 1. The sleeve 3 has a connecting section 3a and an operating section 3b. The shape of the connecting section 3a coincides with that of the outer tube 1. The inner cavity of the operating section 3b has a dimension smaller than the outer tube 1. In other words, after the sleeve 3 is connected with the outer tube 1, the connecting section 3a is covered on the outer tube 1, and the port of the operating section 3b is located against the port of the outer tube 1.

The operating section 3b of the sleeve 3 has a cam 3c connected thereto. A gear 4 is hinged to the cam 3c at the center of the cam 3c. The gear 4 is always inserted among the teeth 2a of the inner tube 2. The distance from the edge of the cam 3c adjacent to the outer tube 1 to the hinging part is smaller than that from the edge of the cam 3c adjacent to the inner tube 2 to the hinging part. The arc-shaped edge of the cam 3c transits smoothly. A part of the gear 4 is protruded from the lower edge of the cam 3c.

Figure 5:
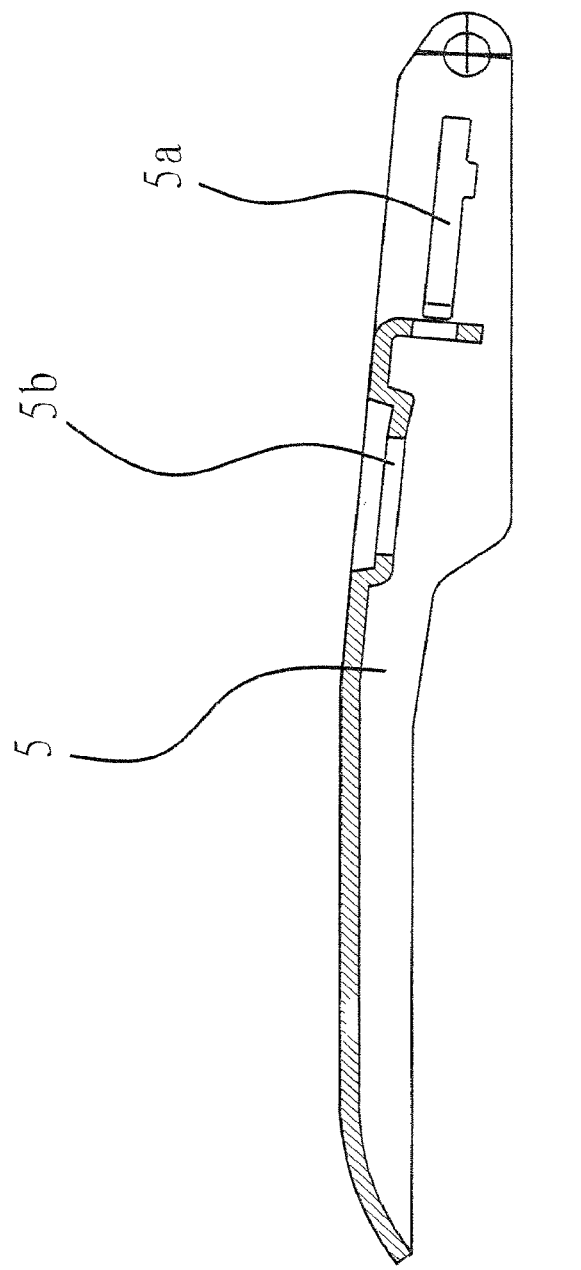
FIG. 5 is a structural diagram of the handle of the cargo supporting device of the invention.

In FIG. 5, a handle 5 is also hinged to the operating section 3b. A positioning mechanism is located between the handle 5 and the connecting section 3a of the sleeve 3. The handle 5 could be located by said positioning mechanism when the handle 5 is turned to the outer pipe 1.

The handle 5 has a baffle 7 which could be axially movable. Both sides of the handle 5 have bar-shape holes 5a axially parallel with the handle 5. Both sides of the baffle 7 could be inserted into said two bar-shape holes 5a respectively. A spring 6 is provided between the baffle 7 and the handle 5. The baffle 7 is set against the cam 3c with the elastic force of the spring 6, and tends to be inserted into the gear 4. In this embodiment, the baffle 7 has a bar-shape connecting piece 7a on which the spring 6 is seated.

The positioning mechanism includes a positioning member 8 and a positioning hole 5b on the handle 5. The inner end of the positioning member 8 is hinged to the sleeve 3. The outer end of the positioning member 8 has a catch 8a protruded to the side and the catch 8a could be joined with the edge of the positioning hole 5b. A lap spring 9 is provided between the positioning member 8 and the outer tube 1. The outer end of the positioning member 8 tends to rest against the edge of the positioning hole 5b under the elastic force of the lap spring 9.

When the cargo supporting device is in use, the handle 5 is turned to the inner tube 2 firstly. In this case, the baffle 7 is removed from the gear 4 by the cam 3c. The gear 4 is brought to rotate while the inner tube 2 is extended or contracted. In other words, the inner tube 2 could be freely contracted with respect to the outer tube 1.

When the extension or contraction length of the inner tube 2 is determined, the handle 5 is turned to the outer tube 1. In such a scenario, the baffle 7 is connected with the gear 4 by using the cam 3c, and the inner tube 2 is fixed by the gear 4. In other words, the inner tube 2 and the outer tube 1 are fixed, and the inner tube 2 could not be freely contracted with respect to the outer tube 1. Therefore, the cargos could be stably fixed by the cargo supporting device in operation.

Moreover, the ends of the outer tube 1 and inner tube 2 other than those connected with each other are respectively provided with foot rests 10 made by rubber materials. As such, the contact area could be enlarged and the buffering function could be activated by the foot rests 10.

Figure 6:
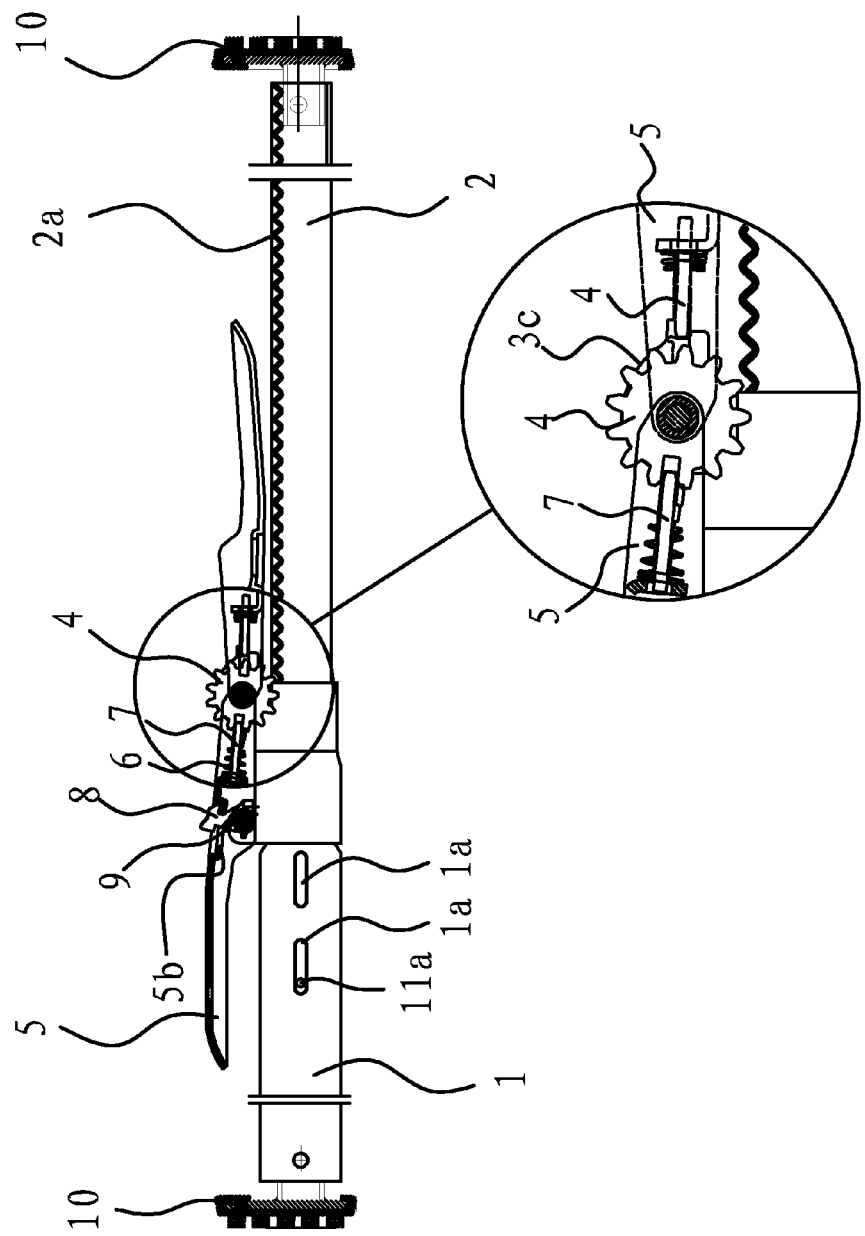
FIG. 6 is a structural diagram of the outline of the cargo supporting device of the invention.

Referring to FIG. 6, the inner tube 2 has a U-shape flexible clip 11 therein. The flexible clip 11 has protruded raised heads 11a at both ends. Said both raised heads 11a partly extend out of the inner tube 2 with the elastic force of the flexible clip 11. The outer tube 1 has bar-shape buffer holes 1a at the side thereof, which are arranged along the axial direction thereof. The raised heads 11a could rest against the edge of the buffer holes 1a. The flexible clip 11 could be in cooperation with the buffer holes to prevent the inner tube 2 sliding too quickly while the inner tube 2 is contacted.

The embodiments as described herein are merely illustrative, by examples, of the spirit of the present invention. Various amendments, modifications, supplementations or substitutions in similar ways, could be made to the embodiments thus described by those skilled in the art, without departing from the spirit of the invention or going beyond the scope of the invention as defined in the accompanying claims.

Although these terms are used herein, such as positioning member 8, lap spring 9 and flexible clip 11, the other similar terms could also be used. These terms are merely used to describe and explain the essence of the invention more conveniently, and any limitation to said terms is regarded as departing from the spirit of the invention.

LIST OF REFERENCE NUMERALS 1 outer tube
1a buffer hole
2 inner tube
2a tooth
3 sleeve
3a connecting section
3b operating section
3c cam
4 gear
5 handle
5a bar-shape hole
5b positioning hole
6 spring
7 baffle
7a connecting piece
8 positioning member
8a catch
9 lap spring
10 foot rest
11 flexible slip
11a raised head

What is claimed is:

1. A cargo supporting device, comprising:
   an inner tube, the inner tube (2) lined with teeth (2a) along an axial surface of the inner tube (2);
   an outer tube (1) partly covering the inner tube (2);
   a jogged part (4), which is a gear (4) hingely attached to the outer tube (1) and which is continuously engaged to the teeth (2a);
   a handle (5) hingely attached to the outer tube (1) at the same position as the gear (4); and
   a clutch mechanism provided between the handle (5) and the jogged part (4);
   characterized in that, the handle (5) is capable of connecting to the jogged part (4) by the clutch mechanism, and the handle (5) is capable of disengaging from the jogged part (4) when the handle (5) is turned to the inner tube (2).

2. The cargo supporting device as claimed in claim 1, characterized in that, the clutch mechanism includes a baffle (7) movable along the axial direction of the handle (5) and a cam (3c) located on the outer tube (1), a spring (6) is provided between the baffle (7) and the handle (5), the baffle (7) could be pressed against the cam (3c) with the elastic force of the spring (6) and tends to be inserted into the gear (4).

3. The cargo supporting device as claimed in claim 2, characterized in that, the inner tube (2) has a U-shape flexible clip (11) therein, the flexible clip (11) has protruded raised heads (11a) at both ends, said both raised heads (11a) partly extend out of the inner tube (2) with the elastic force of the flexible clip (11), the outer tube (1) has bar-shape buffer holes (1a) at the side thereof which are arranged along the axial direction of the outer tube (1), and the raised heads (11a) capable of entering the buffer holes and resting against the edge of the buffer holes (1a).

4. The cargo supporting device as claimed in claim 2, characterized in that, the gear (4) is hinged to the center of the cam (3c), the distance from the edge of the cam (3c) adjacent to the outer tube (1) to a hinging part of the cam (3c) is smaller than that from the edge of the cam (3c) adjacent to the inner tube (2) to the hinging part of the cam (3c), the arc-shaped edge of the cam (3c) transits smoothly, and a part of the gear (4) is protruded from the cam (3c).

5. The cargo supporting device as claimed in claim 4, characterized in that, both sides of the handle (5) have bar-shape holes (5a) axially parallel with the handle (5), and both sides of the baffle (7) could be inserted into said two bar-shape holes (5a) respectively.

6. The cargo supporting device as claimed in claim 4, characterized in that, the baffle (7) has a bar-shape connecting piece (7a) and the spring (6) is seated on the connecting piece (7a).

7. The cargo supporting device as claimed in claim 4, characterized in that, the spring (6) is a coil spring, both ends of the coil spring could act against the handle (5) and the baffle (7) respectively, and the coil spring is located at the side of the handle (5).

8. The cargo supporting device as claimed in claim 7, characterized in that, the handle (5) is hinged to the sleeve (3).

9. The cargo supporting device as claimed in claim 7, characterized in that, the sleeve (3) has a connecting section (3a) and an operating section (3b), the shape of the connecting section (3a) coincides with that of the outer tube (1), the inner cavity of the operating section (3b) has a dimension smaller than that of the outer tube (1), and the cam (3c) is located at the operating section (3b).

10. The cargo supporting device as claimed in claim 9, characterized in that, the positioning mechanism includes a positioning member (8) and a positioning hole (5b) on the handle (5), the inner end of the positioning member (8) could be hinged to the sleeve (3), the outer end of the positioning member (8) has a catch (8a) protruded to the side and the catch (8a) could be joined with the edge of the positioning hole (5b).

11. The cargo supporting device as claimed in claim 7, characterized in that, a positioning mechanism is set between the handle (5) and the connecting section (3a) of the sleeve (3), and the handle (5) could be located by the positioning mechanism when the handle (5) is turned to the outer tube (1).

12. The cargo supporting device as claimed in claim 11, characterized in that, a lap spring (9) is provided between the positioning member (8) and the outer tube (1), and the outer end of the positioning member (8) tends to rest against the edge of the positioning hole (5b) under the elastic force of the lap spring (9).

13. The cargo supporting device as claimed in claim 11, characterized in that, the inner end of the positioning member (8) could be hinged to the sleeve (3).

14. The cargo supporting device as claimed in claim 1, characterized in that, the outer tube (1) is fixedly connected with a sleeve (3) which coincides with the shape of the outer tube (1), and the cam (3c) is integrated with the sleeve (3).

15. The cargo supporting device as claimed in claim 1, characterized in that, the ends of the outer tube (1) and inner tube (2) other than those connected with each other are respectively provided with foot rests (10) made by rubber materials.

16. The cargo supporting device as claimed in claim 1, characterized in that, the inner tube (2) has a U-shape flexible clip (11) therein, the flexible clip (11) has protruded raised heads (11a) at both ends, said both raised heads (11a) partly extend out of the inner tube (2) with the elastic force of the flexible clip (11), the outer tube (1) has bar-shape buffer holes (1a) at the side thereof which are arranged along the axial direction of the outer tube (1), and the raised heads (11a) capable of entering the buffer holes and resting against the edge of the buffer holes (1a).

* * * * *